United States Patent [19]

Uchida et al.

[11] Patent Number: 5,271,866
[45] Date of Patent: Dec. 21, 1993

[54] LIQUID-CRYSTALLINE POLYMER COMPOSITION

[75] Inventors: Shunji Uchida; Kazuharu Morita; Kenji Hashimoto, all of Chiba, Japan

[73] Assignee: Idemitsu Kosan Co., Ltd., Tokyo, Japan

[21] Appl. No.: 703,838

[22] Filed: May 21, 1991

Related U.S. Application Data

[60] Division of Ser. No. 577,122, Sep. 4, 1990, Pat. No. 5,034,153, which is a continuation-in-part of Ser. No. 212,475, Jun. 28, 1988, abandoned.

[30] Foreign Application Priority Data

Jun. 29, 1987 [JP] Japan .............................. 62-159735

[51] Int. Cl.$^5$ ..................... C09K 19/52; C09K 19/12; C08J 5/00; C08J 5/10
[52] U.S. Cl. .............. 252/299.01; 252/299.6; 252/299.65; 252/299.66; 252/299.67; 428/1; 524/81; 524/186; 524/190; 524/287; 524/288; 524/290; 524/292; 524/299
[58] Field of Search ........... 252/299.01, 299.6, 299.64, 252/299.65, 299.66, 299.67; 428/1; 524/81, 186, 190, 287, 288, 290, 292, 299; 528/191, 195, 272, 288, 299

[56] References Cited

U.S. PATENT DOCUMENTS

| | | | |
|---|---|---|---|
| 4,293,435 | 10/1981 | Portugall et al. | 252/299.01 |
| 4,780,241 | 10/1988 | Furukawa et al. | 252/299.01 |
| 4,818,807 | 4/1989 | Morita et al. | 252/299.01 |
| 4,844,835 | 7/1989 | Uchida et al. | 252/299.01 |
| 4,904,066 | 2/1990 | Gray et al. | 252/299.01 |
| 4,913,839 | 4/1990 | Uchida et al. | 252/299.01 |
| 5,034,153 | 7/1991 | Uchida et al. | 252/299.01 |

Primary Examiner—Philip Tucker
Attorney, Agent, or Firm—Antonelli, Terry, Stout & Kraus

[57] ABSTRACT

A liquid-crystalline polymer composition comprising a ferroelectric liquid-crystalline polymer and a low molecular weight liquid-crystalline compound which exhibits smectic C phase or chiral smectic C phase. Such liquid-crystalline polymer compositions have not only excellent moldabilities such as ease of orientation, but also exhibit chiral smectic C phase at wide temperature range within room temperatures and exhibit high speed response to changes of external fields and high contrast ratios when they are used for optical display elements.

3 Claims, No Drawings

LIQUID-CRYSTALLINE POLYMER COMPOSITION

This is a divisional of application Ser. No. 07/577,122, filed Sep. 4, 1990 now U.S. Pat. No. 5,034,153; which is a continuation of application Ser. No. 07/212,475, filed Jun. 28, 1988 now abandoned.

DESCRIPTION OF THE INVENTION (a) Field of the Invention

The present invention relates to liquid-crystalline polymer compositions and in particular to liquid-crystalline polymer compositions having liquid-crystalline properties, which compositions not only exhibit ferroelectricity even at temperatures around room temperature but also have high response speed to external factors enabling display of motion pictures and, as well, can be advantageously used as display elements for large display screens or curved display screens. Such liquid-crystalline polymer compositions are useful as various electronic optical devices in optoelectronics fields, particularly for information board, sign board, autoinstrument panel, control panel, electronic optical shutters, electronic optical diaphragms, optical modulators, optical-path transfer switches in optical communication systems, memories, liquid crystal printer heads, varifocal lenses, and so forth.

(b) Description of the Related Art

Display elements in which low molecular weight liquid crystals are employed have been widely used for digital display of desk calculators, clocks and watches, etc. In these fields of utilization, conventional low molecular weight liquid crystals are generally supported between a couple of glass substrates spaced each other in microns. However, it has been practically impossible to conduct such an adjustment of the space on large display screens or curved display screens. In order to solve the problem, some attempts have been made to provide polymeric liquid crystals so that the liquid crystals per se can be molded (See, e.g., J. Polym. Sci., Polym. Lett., Ed. 13, 243 (1975), Polym. Bull., 6, 309 (1982), Japanese Patent Application Laid-opens No. 21,479/1980 and 137,133/1986).

Nevertheless, these conventional liquid-crystalline polymers in general exhibit slow response in the changes of their transmission intensity to the changes of external factors such as electric field, and therefore there has been obtained no satisfactory one.

Further, the liquid-crystalline polymers disclosed in the above Japanese Patent Application Laid-opens have deficiencies that they do not exhibit any liquid-crystalline property at room temperature unless they are heated at temperatures between their glass transition temperatures and clearing points.

Also, there have been proposed some liquid-crystalline polymer compositions, such as liquid crystal compositions consisting of a thermoplastic amorphous polymer and a low molecular weight liquid crystal (Japanese Patent Application Laid-open No. 47,427/1986); and liquid-crystalline compositions consisting of an information memory media, i.e. a polymeric liquid crystal and a low molecular weight liquid crystal, and a polymer compound (Japanese Patent Application Laid-open No. 10,930/1984). However, these liquid-crystalline polymer compositions are practically useless since the temperature ranges of their chiral smectic C phase are high, or are extremely narrow when being high, and they exhibit chiral smectic C phase only at temperatures in a falling stage.

SUMMARY OF THE INVENTION

The object of the present invention is to solve the above-mentioned problems and to provide liquid-crystalline polymer compositions having excellent advantages in practical use. Specifically, the object of the present invention is to provide liquid-crystalline polymer compositions which have not only excellent moldabilities such as ease of orientation, but also wide chiral smectic C phase ranges within room temperatures, and, in addition, exhibit high response speeds to external factors and high contrast ratios when they are used in optical display elements. Such compositions can be advantageously used as liquid-crystalline materials for motion picture display elements, large display screens or curved display screens.

It has now been found that the object of the present invention can be attained by liquid-crystalline polymer compositions prepared by blending a specific liquid-crystalline polymer, i.e. a ferroelectric liquid-crystalline polymer, with a specific low molecular weight liquid-crystalline compound, i.e. a low molecular weight liquid-crystalline compound exhibiting chiral smectic C phase or smectic C phase, and the present invention has been completed by the knowledge.

That is, the present invention provides a liquid-crystalline polymer comprising a ferroelectric liquid-crystalline polymer and a low molecular weight liquid-crystalline compound which exhibit smectic C phase or chiral smectic C phase.

DESCRIPTION OF THE PREFERRED EMBODIMENT

The ferroelectric liquid-crystalline polymers which may be used in the present invention are not limited and may be of various kinds. For example, polymers having side chain type liquid-crystalline units may be suitably used.

Some typical examples of such ferroelectric liquid-crystalline polymers include polymers or copolymers, each having the repeating units represented by the respective following general formula, or blends thereof.

(I) Polyacrylate type $$\begin{array}{c} +CH_2-CH+ \\ | \\ COO-(CH_2)_k-O-R^1 \end{array}$$

wherein,
k is an integer of 1 to 30,
$R^1$ is

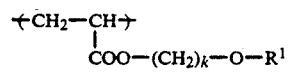

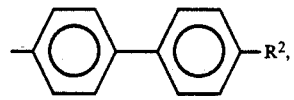

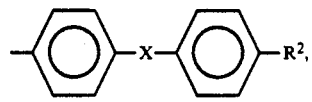

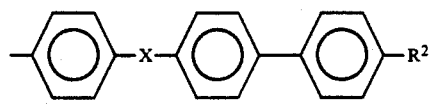

or

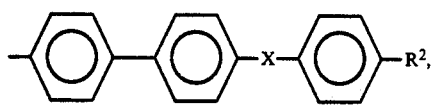

X is —COO— or —OCO—,
R² is —COOR³, —OCOR³, —OR³ or —R³,
wherein
R³ is a radical represented by the following general formula:

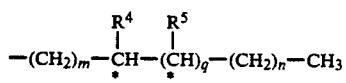

wherein
m and n are each independently an integer of 0 to 9,
q is 0 (zero) or 1,
R⁴ and R⁵ are each independently —CH₃, a halogen radical or —CN, with the proviso that n is not 0 (zero) when R⁵ is —CH₃,
C* is an asymmetric carbon atom,
C(*) is an asymmetric carbon atom when n is not 0 (zero).

The number average molecular weight of these polymers is preferably 1,000 to 400,000. Particularly preferable range of the number average molecular weight cannot be uniformly limited since it varies depending upon the kind of R¹, value of k, optical purity of R³, etc. It however is usually 1,000 to 200,000.

These polymers can be generally prepared by polymerizing a monomer represented by the following general formula:

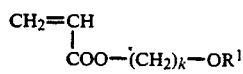

wherein k, R¹, R², R³, R⁴, R⁵, m, and n are as defined above, by known method in the art.

[II] Polysiloxane type

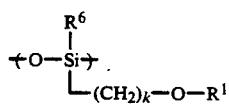

wherein
R⁶ is a lower alkyl radical, and
R¹, R², R³, R⁴, R⁵, k, m, and n are as defined above.

The number average molecular weight of these polymers is preferably 1,000 to 400,000. Particularly preferable range of the number average molecular weight cannot be uniformly limited since it varies depending upon the kind of R¹, value of k, m, and n, optical purity of R³, etc. It is however usually 1,000 to 200,000.

The polymers can be prepared by reacting an alkylhydropolysiloxane having the repeating units represented by the following general formula:

wherein R⁶ is as defined above, with a liquid crystal unit compound represented by the following general formula:

$$CH_2=CH(CH_2)_{k-2}-O-R^1$$

wherein R¹, R², R³, R⁴, R⁵, k, m, and n are as defined above, under specific conditions.

[III] Polyether type

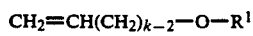

wherein R¹, R², R³, R⁴, R⁵, k, m and n are as defined above.

The polymers can be prepared by polymerizing a monomer represented by the following general formula:

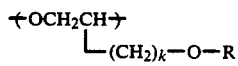

wherein k, R¹, R², R³, R⁴, R⁵, m, and n are as defined above, by known method in the art.

[IV] Polyester type

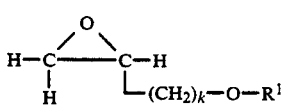

wherein
R⁷ is —H, —CH₃ or —C₂H₅,
s is an integer of 1 to 20,
A is 0 (oxygen) or —COO—,
t is 0 (zero) or 1, and
R¹, R², R³, R⁴, R⁵, k, m, and n are as defined above,
or

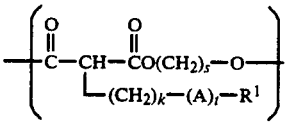

wherein R⁷, s, A, t, R¹, R², R³, R⁴, R⁵, k, m, and n are as defined above.

These polymers can be prepared by polycondensation reaction for preparing usual polyesters. That is, these polymers can be prepared by polycondensing a dibasic acid having a structure corresponding to the acid unit in the above formulas or an acid chloride therefrom with a dihydric alcohol having a structure corresponding to the alcohol unit in the above formulas.

Among the above-described ferroelectric liquid-crystalline polymers of types (I) to (IV), those having dicyclic mesogenic units, which can exhibit chiral smectic C phase in low temperature ranges, are preferable. Concretely, those wherein $R^1$ is

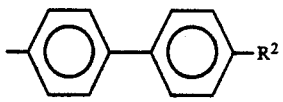

or

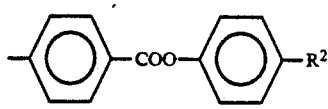

(in which $R^2$ is as defined above) are preferable.

The number average molecular weight of these polymers is preferably 2,000 to 400,000. When it is less than 2,000, the moldability of the polymers into film or coated film is sometimes deteriorated. On the other hand, when it exceeds 400,000, there sometimes occur undesirable results such as delayed electric field response speed. Particularly preferable range of the number average molecular weight cannot be uniformly limited since it varies depending upon the kind of $R^1$, value of k, optical purity of $R^3$, etc. It is however usually 1,000 to 200,000.

These ferroelectric liquid-crystalline polymers can also be used in a combination of two or more of them within the range where the attainment of the object invention is not hindered.

Various kinds of low molecular weight liquid-crystalline compounds exhibiting smectic C phase or chiral smectic C phase may be used in the present invention. Concretely, the following low molecular weight liquid-crystalline compounds can be suitably used.

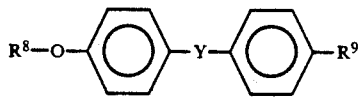

wherein,
$R^8$ is an alkyl, cyanoalkyl, chloroalkyl or fluoroalkyl, each having 1 to 20, preferably 4 to 10 carbon atoms,
Y is —COO—, —OCO—, —CH=N—, —N=N—,

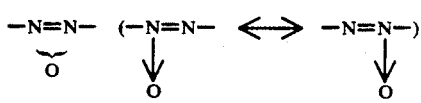

or single bond, preferably —COO— or

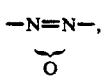

and
$R^9$ is —COOR$^{10}$, —OCOR$^{10}$, —OR$^{10}$ or —R$^{10}$, wherein $R^{10}$ is an alkyl, cyanoalkyl, fluoroalkyl or chloroalkyl, each alkyl being linear alkyl or branched alkyl, preferably branched alkyl, and having 1 to 20, preferably 4 to 10 carbon atoms, and $R^{10}$ may have one or more chiral carbon atoms or have no chiral carbon atom.

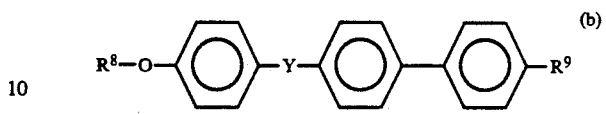

wherein $R^8$, Y, and $R^9$ are as defined above.

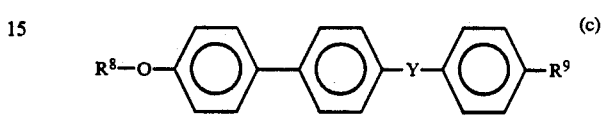

wherein $R^8$, Y, and $R^9$ are as defined above.

When $R^8$ and $R^{10}$ are alkyls, some illustrative examples of the low molecular weight liquid-crystalline compounds include;
alkyl 4'-alkoxybiphenyl-4-carboxylate,
alkyl 4-(4'-alkoxybenzoyloxy)benzoate,
4'-alkoxyphenyl 4-alkoxybenzoate,
4''-alkoxyphenyl 4'-alkoxybiphenyl-4-carboxylate,
4''-(alkoxycarbonyl)phenyl 4'-alkoxybiphenyl-4-carboxylate,
4''-(alkoxycarbonyl)biphenyl 4'-yl4-alkoxybenzoate,
4''-alkoxybiphenyl 4-alkoxybenzoate,
alkyl 4-(4'-alkoxyphenylazo)benzoate,
4-(4'-alkoxyphenylazo)-1-acyloxybenzene,
4,4'-dialkoxyazobenzene,
4-(4'-alkoxyphenylazo)-1-alkylbenzene,
4-(4''-alkoxyphenylazo)-4'-alkoxycarbonylbiphenyl,
4-(4''-alkoxyphenylazo)-4'-alkylbiphenyl, 4-(4''-alkoxyphenylazo)-4'-alkoxybiphenyl,
4-(4''-alkoxyphenylazo)-4'-acyloxybiphenyl,
4-(4''-alkylphenylazo)-4'-alkoxybiphenyl,
4-(4''-acyloxyphenylazo)-4'-alkoxybiphenyl,
4-(4''-alkoxycarbonylphenylazo)-4'-alkoxybiphenyl,
4'-alkoxyphenyl 4-alkylbenzoate,
4'-alkoxyphenyl 4-acyloxybenzoate,
4-(4''-alkoxyphenyloxycarbonyl)-4'-alkylbiphenyl,
4-(4''-alkoxyphenyloxycarbonyl)-4'-acyloxybiphenyl,
4-(4''-alkoxyphenyloxycarbonyl)-4'-alkoxycarbonylbiphenyl,
4-(4''-alkoxyphenylazoxy)-1-alkylbenzene,
4-(4''-alkoxyphenylazoxy)-1-acyloxybenzene,
4-(4''-alkoxyphenylazoxy)-1-alkoxybenzene,
alkyl 4-(4''-alkoxyphenylazoxy)benzoate,
4-(4''-alkoxyphenylazoxy)-4'-alkylbiphenyl,
4-(4''-alkoxyphenylazoxy)-4'-alkoxybiphenyl,
4-(4''-alkoxyphenylazoxy)-4'-acyloxybiphenyl,
4-(4''-alkoxyphenylazoxy)-4'-alkoxycarbonylbiphenyl,
4-(4''-alkylphenylazoxy)-4'-alkoxybiphenyl,
4-(4''-acyloxyphenylazoxy)-4'-alkoxybiphenyl,
4-(4''-alkoxycarbonylphenylazoxy)-4'-alkoxybiphenyl,
4-alkoxy-N-(4'-alkylbenzylidene)aniline,
4-alkoxy-N-(4'-alkoxybenzylidene)aniline,
4-alkoxy-N-(4'-acyloxybenzylidene)aniline,
4-acyloxy-N-(4'-alkoxybenzylidene)aniline,
4-alkoxycarbonyl-N-(4'-alkoxybenzylidene)aniline,
4-alkoxy-N-(4'-alkoxycarbonylbenzylidene)aniline,
4-(4'-alkylphenyl)-N-(4''-alkoxybenzylidene)aniline,
4-alkoxy-N-[4'-(4'''-alkylphenyl)benzylidene]aniline,
4-(4'-alkoxyphenyl)-N-(4''-alkoxybenzylidene)aniline, 4-alkoxy-N-[4'-(4"-alkoxyphenyl)benzylidene]aniline,
4-(4'-acyloxyphenyl)-N-(4"-alkoxybenzylidene]aniline,
4-alkoxy-N-[4'-(4"-acyloxyphenyl)benzylidene]aniline,
4-(4'-alkoxycarbonylphenyl)-N-(4"-alkoxybenzylidene)aniline,
4-alkoxy-N-[4'-(4"-alkoxycarbonylphenyl)benzylidene]aniline,
4-alkyl-N-[4'-(4"-alkoxyphenyl)benzylidene]aniline,
4-(4'-alkoxyphenyl)-N-(4"-alkylbenzylidene)aniline,
4-acyloxy-N-[4'-(4"-alkoxyphenyl)benzylidene]aniline,
4-(4'-alkoxyphenyl)-N-(4"-acyloxybenzylidene)aniline,
4-alkoxycarbonyl-N-[4'-(4"-alkoxyphenylbenzylidene)-]aniline,
4-(4'-alkoxyphenyl)-N-(4"-alkoxycarbonylbenzylidene)aniline,
4-alkyl-4'-alkoxybiphenyl,
4,4'-dialkoxybiphenyl,
4-acyloxy-4'-alkoxybiphenyl,
4-alkyl-4"-alkoxyterphenyl,
4,4"-dialkoxyterphenyl,
4-acyloxy-4"-alkoxyterphenyl, and
4-alkoxycarbonyl-4"-alkoxyterphenyl.

The illustrative examples of the alkyls, $R^8$ and $R^9$, in these compounds include methyl, ethyl, propyl, isopropyl, butyl, isobutyl, 1-methylpropyl, pentyl, 2-methylbutyl, 1-methylbutyl, hexyl, isohexyl, 1-methyloctyl, heptyl, isoheptyl, octyl, isooctyl, nonyl, isononyl, decyl, and isodecyl, and these alkyls may be substituted by chlorine, fluorine, —CN, etc.

Among these various compounds, preferred are those which exhibit chiral smectic C phase or smectic C phase at a particularly wide temperature range. Concretely, such compounds include; 2-methylbutyl 4'-[4"-decyloxybenzoyloxy)biphenyl-4-carboxylate, 4,4'-nonyloxyazoxybenzene, 4"(pentyloxycarbonyl)phenyl 4'-octyloxybiphenyl-4-carboxylate, 2-methylbutyl 4'-(4"-octyloxybenzoyloxy)biphenyl-4-carboxylate, 2-methylbutyl 4'-octyloxybiphenyl-4-yl-carboxybenzoate, and 2-methylbutyl 4-(4'-octyloxybenzoyloxy)benzoate.

In the present invention, these low molecular weight liquid-crystalline compounds may also be used in combination of two or more of them within the limit that the attainment of the object of the present invention is not hindered.

The liquid-crystalline polymer compositions of the present invention can be obtained by blending the above-mentioned liquid-crystalline polymers (A) and the low molecular weight liquid-crystalline compounds (B) which exhibit chiral smectic C phase or smectic C phase.

The suitable weight ratio between the (A) and (B) to be blended, i.e. (A)/(B), is generally 99/1–50/50, preferably 95/5–60/40. When the value of (A)/(B) is larger than 99/1, the extension of the temperature ranges at which the compositions exhibit chiral smectic C phase are sometimes insufficient. On the other hand, when it is less than 50/50, the moldability into films is sometimes deteriorated.

When the liquid-crystalline polymer compositions of the present invention is formed into films, they may be also mixed with other liquid-crystalline polymers or resins usually used in the art such as olefin resins, acrylic resins, methacrylic resins, polystyrene resins, polyester resins, polycarbonate resins, and styrene-butadiene copolymers, in addition to the above-described (A) and (B), within the range that the attainment of the object of the present invention is not hindered. However, if these resins are mixed in large amounts, the liquid-crystalline properties of the compositions of the present invention will be decreased so that they become unable to exhibit wide chiral smectic C phase in the range of room temperatures and their response speeds to external factors are lowered. Therefore the preferable weight ratio of the these resins to the sum of the components (A) and (B) is 2 or less.

The method of blending the above-mentioned components is not particularly limited, and the blending can be carried out using usual blending method.

From the measurement of the phase transition temperatures, the liquid-crystalline polymer compositions of the present invention are confirmed to be ferroelectric liquid-crystalline polymers which can exhibit chiral smectic C phase liquid crystal state at relatively low and wide temperature ranges including room temperature range. It was further confirmed that the electric field response speed is so extremely high as 0.001 to 0.03 seconds or less and the contrast ratios are high.

The liquid-crystalline polymer compositions of the present inventions have so excellent moldabilities such as moldability into films as to be easily oriented, and they may be advantageously used as display elements for motion pictures or as display elements for large display screens or curved display screens, not to mention as optical elements for usual display elements, memory elements, etc.

When the liquid-crystalline polymer compositions of the present invention is applied for practical use, they can be formed into films by any known method of forming films, such as casting techniques, T-dye techniques, inflation techniques, calender techniques, coating techniques, and stretching techniques. The films formed from the polymer compositions can be utilized in various optoelectronics fields, for example for liquid crystal displays, electronic optical shutters, and electronic optical diaphragms, by disposing each film between two substrates, such as two large glass substrates, curved glass substrates, polyester films, and polyethersulfone films, not to mention usual glass substrates, with two usual electrically conducting layers each disposed between the substrate and the film. Also, the liquid-crystalline polymer compositions of the present invention may be directly formed into films adhering to a substrate by dissolving a composition in a suitable solvent, applying the resulting solution to a surface of a substrate such as glass substrate, and then evaporating the solvent.

In the case of stretching techniques, the films can be oriented by any method usually employed for orientation of plastic films, for example uniaxial stretching, biaxial stretching, press stretching, or inflation stretching. Among these orientation techniques, uniaxial stretching is suitably employed. The stretch ratio is usually 30 to 1,000%, preferably 50 to 600%. When the stretch ratio is less than 30%, the orientation degree of the liquid-crystalline polymer compositions is low resulting in poor contrast ratio. When it exceeds 1,000%, it becomes impossible to form continuous films. Herein, stretch ratio means the ratio of the length of film after stretching (L'') to the length of film before stretching (L).

$$\text{Stretch ratio} = (L'/L) \times 100 \,(\%)$$

Also, the orientation of the liquid-crystalline polymer compositions of the present invention can be conducted by either orienting a liquid-crystalline polymer composition alone, or by disposing the polymer composition between two plastic films and then orienting the resulting laminate. Further, the orientation can also be conducted by supporting the liquid-crystalline polymer composition between two transparent substrates and then pressing the resulting laminate.

When the liquid-crystalline polymer compositions of the present invention is made into liquid crystal optical elements, at least one of the two electrically conducting layers should be transparent. Some illustrative examples of the transparent electrically conducting layers which may be used include NESA layers sublimated with tin oxide and ITO layers consisting of tin oxide and indium oxide. It is preferable to provide the transparent electrically conducting layers inside a transparent substrate made from glass or transparent plastic (such as polymethylmethacrylates, polycarbonates, and polyethersulfones). When the liquid-crystalline polymer compositions of the present invention are used for display elements, it is preferable to provide a polarization plate or a reflecting plate outside the transparent substrate.

Some illustrative examples of the opaque electrically conducting layers which may be used include sublimated layers and gold spattering layers.

The liquid-crystalline polymer compositions of the present invention have both of the properties of smectic phase liquid crystal state and the typical property of polymers, i.e. excellent moldability, and they therefore have large possibility of usage in the fields of integrated optics, optoelectronics, and information memory. For example, the liquid-crystalline polymer compositions of the present invention may be used as various electronic optical devices for example liquid crystal displays such as digital displays of various forms, electronic optical shutters, optical-path transfer switches in optical communication system, electronic optical diaphragms, memory devices, optical modulators, liquid crystal optical printer heads, varifocal lenses, and the like.

The liquid-crystalline polymer compositions of the present invention may be further improved by various treatments well known in the art, for example, by mixing two or more of them, mixing with other polymers, addition of additives such as various inorganic or organic compounds or metals including stabilizers, plasticizers, etc.

The present invention will be described in more detail with reference to the following examples. These examples, however, are intended to illustrate the invention and are not to be construed to limit the scope of the invention.

EXAMPLE

In the following examples, the structures of the obtained polymers and compounds were confirmed by NMR, IR, and elemental analysis, and measurement of the phase transition temperatures and confirmation of the phases were conducted using a DSC and a polarization microscope respectively. The measurements of the response speeds with the electric field and contrast ratios were conducted as follows.

Measurement of Response Speed

Each liquid-crystalline polymer composition obtained was oriented by means of uniaxial stretching at 60°–100° C. and 1 cm/sec (stretch ratio: 200%) and thus a film of 5 to 10 μm in thickness was obtained. The film was supported with two patterned ITO substrates (20×10 mm) to produce a cell. An AC electric field of $4\times10^6$ V/m was applied to the cell while measuring the response time occupied on the changes of transmission intensity (0→90%)

Measurement of Contrast Ratio

Measurement of contrast ratio was conducted by placing a cell produced by the above method between two polarizers orthogonally crossing each other and then measuring the ratio between the transmission intensities measured at applied electric fields being reversed each other.

The phases are shown using the following abbreviations. [Cry: crystal, Iso: isotropic liquid, SmA: smectic A phase liquid crystal state, SmC: smectic C phase liquid crystal state, N: nematic phase liquid crystal state, N*: chiral nematic phase liquid crystal state, SmC*: chiral smectic C phase liquid crystal state, S$_1$: an unidentified smectic liquid crystal state, glass: glass state]

The numerals in the schemata showing the phase transition behavior show the phase transition temperatures in °C.

EXAMPLE 1

Preparation of the Liquid-Crystalline Polymer Having the Repeating Units Represented by the Following Formula

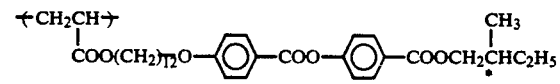

(1) Synthesis of 12-bromododecyl acrylate 0.21 mol (14.8 g) of acrylic acid and 0.23 mol (41.8 g) of tetramethylammonium hydroxide (pentahydrate) were stirred for 2 hours in 300 ml of DMF (dimethylformamide) until a homogeneous solution was obtained. After addition of 0.21 mol (77.4 g) of 1,12-dibromododecane, the resulting solution was further stirred for 10 hours. To the reaction solution was then added 300 ml of water and the mixture was extracted with ether. The extract was purified by column chromatography to obtain 24.6 g of the objective bromoester compound (1a). (Yield: 37%)

(2) Synthesis of 2-methylbutyl p-hydroxybenzoate 0.29 mol (40.0 g) of p-hydroxybenzoic acid and 0.35 mol (30.9 g) of (S)-(−)-2-methylbutanol were refluxed for 20 hours in 150 ml of toluene in the presence of 1 ml of concentrated sulfuric acid. The reaction solution was concentrated and then purified by column chromatography to obtain 53.2 g of 2-methylbutyl p-hydroxybenzoate [[α]$_D^{23}$=+4.95° (CHCl$_3$)]. (Yield: 88%)

(3) Synthesis of 4-carbobenzoxyoxybenzoic acid

To an aqueous solution of 55 mmol (7.6 g) of p-hydroxybenzoic acid and 65 mmol (2.6 g) of sodium hydroxide in 200 ml of water was added 65 mmol (10.6 g) of carbobenzoxy chloride dropwise during cooling with ice. After 24 hours, the generated precipitate was washed with water, filtered, dried, and purified by column chromatography, to obtain 15.0 g of 4-carbobenzoxyoxybenzoic acid (m.p.: 181.9°–183.1° C.). (Yield: 99%)

(4) Synthesis of 4-carbobenzoxyoxybenzoyl chloride

A solution of 27 mmol (7.3 g) of 4-carbobenzoxyoxybenzoic acid obtained in (3) and 27 mmol (5.6 g) of phosphorous pentachloride in 50 ml of ether was stirred for 24 hours at room temperature. After conclusion of the reaction, ether was removed and then the resulting crystals were recrystallized from hexane to obtain 4.5 g of 4-carbobenzoxyoxybenzoyl chloride (m.p.: 65.5°–67.4° C.). (Yield: 57%)

(5) Synthesis of 2-methylbutyl 4-(4'-carbobenzoxyoxybenzoyloxy)benzoate

A solution of 16 mmol (3.3 g) of 2-methylbutyl p-hydroxybenzoate obtained in (2) in a solvent mixture of 20 ml of THF (tetrahydrofuran) and 40 ml of pyridine was cooled, and to the solution was then added a THF solution of 10 mmol (2.9 g) of 4-carbobenzoxyoxybenzoyl chloride dropwise. After the temperature was returned slowly to room temperature, the mixture was stirred for 8 hours. After conclusion of the reaction, the reaction solution was extracted with ether, concentrated, and purified by column chromatography, to obtain 2.9 g of 2-methylbutyl 4-(4'-carbobenzoxyoxybenzoyloxy)benzoate (m.p.: 64.4°–65.4° C.). (Yield: 63%)

(6) Synthesis of 2-methylbutyl 4-(4'-hydroxybenzoyloxy)benzoate

An ethyl acetate solution of 6 mmol (2.8 g) of 2-methylbutyl 4-(4'-carbobenzoxyoxybenzoyloxy)benzoate obtained in (5) and 0.5 g of palladium carbon (5%-catalyst) was reacted for 4 hours in the atmosphere of gaseous hydrogen. After conclusion of the reaction, palladium carbon was filtered out with a membrane filter. The filtrate was concentrated and then purified by column chromatography to obtain 1.26 g of 2-methylbutyl 4-(4'-hydroxybenzoyloxy)benzoate (m.p.: 90.8°–92.6° C.). (Yield: 64%)

(7) Synthesis of 2-methylbutyl 4-[4'-(12-acryloyloxydodecyloxy)benzoyloxy]benzoate An acetone solution of 3.9 mmol (1.2 g) of the bromoester compound (1a) obtained in (1), 3.3 mmol (1.1 g) of 2-methylbutyl 4-(4'-hydroxybenzoyloxy)benzoate obtained in (6), and 15 mmol (2.1 g) of potassium carbonate was refluxed for 8 hours. After conclusion of the reaction, the reaction solution was successively filtered, concentrated, purified by column chromatography, and recrystallized from ethanol, to obtain 0.99 g of the objective monomer (3a) $[[\alpha]_D^{23} = +2.11'$ $(CHCl_3)]$. (Yield: 53%)

(8) Polymerization

Into a glass ampoule were placed 1.1 mmol (0.6 g) of the monomer (3a) obtained in (7), 0.26 mg of AIBN (azobisisobutyronitrile), and 2 ml of dried THF. After the system was deaerated by freezing, reaction was carried out for 15 hours at 60° C. After cooling, the resulting reaction product was successively concentrated, diluted with chloroform (20 ml/g), and purified by high speed liquid chromatography, to obtain 0.3 g of the objective liquid-crystalline polymer ($A_1$) (Mn=5,300). (Conversion percentage: 50%)

The liquid-crystalline polymer ($A_1$) exhibited the following phase transition behavior:

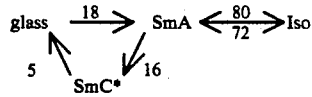

Synthesis of Low Molecular Weight Liquid-Crystalline Compound

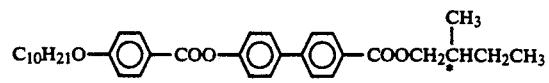

The low molecular weight liquid-crystalline compound ($B_1$) having the above structure was synthesized according to the method disclosed in Japanese Patent Application Laid-open No. 32,748/1985.

The results of measurement of the phase transition behavior of the ester compound ($B_1$) was as follows:

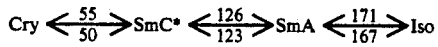

Preparation of Liquid-Crystalline Polymer Composition

A liquid-crystalline polymer composition ($C_1$) was prepared by blending the liquid-crystalline polymer ($A_1$) and the ester ($B_1$) in the weight ratio of ($A_1$)/($B_1$)=85:15.

The phase transition behavior, electric field response speed, and contrast ratio of the composition ($C_1$) were measured. The results are as follows.

Phase transition behavior

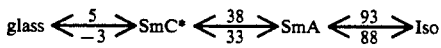

Response speed (0→90%): 0.03 seconds (28° C.)
Contrast ratio: 18

EXAMPLE 2

Preparation of the Liquid-Crystalline Polymer Having the Repeating Units Represented by the Following Formula

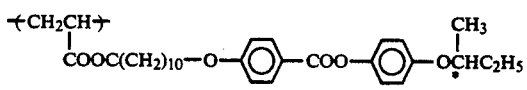

(1) Synthesis of 4-(1-methylpropoxy)phenol

A solution of 0.1 mol (11.0 g) of hydroquinone, 0.1 mol (22.8 g) of 1-methylpropyl p-toluenesulfonate, and 0.2 mol (8.0 g) of potassium hydroxide in 100 ml of ethanol was refluxed for 5 hours with stirring, and the reaction mixture was then concentrated. After the obtained concentrate was dissolved into methylene chloride, the resulting solution was washed with diluted hydrochloric acid and then purified by column chromatography, to obtain 8.3 g of the objective hydroxy compound. (Yield: 50%)

(2) Synthesis of 4-(1-methylpropoxy)phenyl 4-(12-bromododecyloxy)benzoate

A solution of 10 mmol (3.9 g) of 4-(12-bromododecyloxy)benzoic acid and 30 mmol (3.7 g) of thionyl chloride in 50 ml of 1,2-dichloroethane was refluxed for 3 hours with stirring, and the resulting reaction solution was concentrated to obtain an acid chloride compound. A solution of the acid chloride compound in 10 ml of THF was added dropwise into a solution of 10 mmol (1.7 g) of the hydroxy compound obtained in (1) and 2 ml of triethylamine in 20 ml of THF, and the mixture was stirred for 10 hours at room temperature. After the reaction solution was concentrated, the concentrate was dissolved in methylene chloride. The resulting solution was washed with diluted hydrochloric acid, and then purified by column chromatography to obtain 4.3 g of a bromo compound. (Yield: 80%)

(3) Synthesis of 4-(1-methylpropoxy)phenyl 4-(12-acryloyloxydodecyloxy)benzoate A solution of 6 mmol (3.2 g) of the bromo compound obtained in (2), 10 mmol (0.72 g) of acrylic acid, and 10 mmol (1.8 g) of tetramethylammonium hydroxide (pentahydrate) in 30 ml of DMF was stirred for 10 hours at room temperature. To the resulting reaction solution was added water and then extracted with ether. The extract was concentrated, and the concentrate was purified by column chromatography to obtain 2.2 g of the objective monomer (3b). (Yield: 71%)

(4) Polymerization 10 mmol (520 mg) of the monomer obtained in (3) was reacted in 5 ml of THF for 15 hours at 60° C. using 3.3 mg of AIBN as polymerization initiator. The product of polymerization was purified by column chromatography to obtain 470 mg of the objective liquid-crystalline polymer (A$_2$) (Mn=4,600). (Conversion percentage: 90%)

The phase transition behavior of the liquid-crystalline polymer (A$_2$) was measured, and the results are as follows:

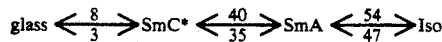

Preparation of Low Molecular Weight Liquid-Crystalline Compound

Synthesis of 4,4'-nonyloxyazoxybenzene

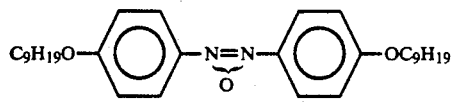

4,4'-nonyloxyazoxybenzene was synthesized according to the method disclosed by D. Demus and H. Sackmann in Phys. Chem. 222, 127 (1963).

The phase transition behavior of the obtained low molecular weight liquid-crystalline compound (B$_2$) was measured, and the results are as follows:

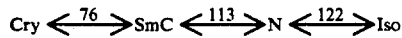

Preparation of Liquid-Crystalline Polymer Composition

A liquid-crystalline polymer composition (C$_2$) was prepared by blending the liquid-crystalline polymer (A$_2$) and the low molecular weight liquid-crystalline compound (B$_2$) in the weight ratio of (A$_2$)/(B$_2$)=85:15.

The phase transition behavior, electric field response speed, and contrast ratio of the composition (C$_2$) were measured. The results are as follows.

Phase transition behavior

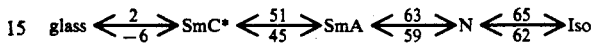

Response speed (0→90%): 0.02 seconds (35° C.)
Contrast ratio: 15

EXAMPLE 3

Preparation of the Liquid-Crystalline Polymer Having the Repeating Units Represented by the Following Formula

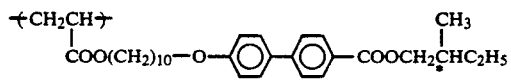

(1) Synthesis of 10-bromodecyl acrylate 0.2 mol (14.1 g) of acrylic acid and 0.22 mol (40.6 g) of tetramethylammonium hydroxide (pentahydrate) were stirred for 2 hours in 300 ml of DMF. To the reaction solution was then added 0.4 mol (120 g) of 1,10-dibromodecane, and the mixture was stirred for 10 hours. To the reaction solution was added 300 ml of water and then extracted with ether. The extract was dried, concentrated, and purified by column chromatography, to obtain 30.9 g of the objective bromoester compound (1c). (Yield: 53%)

(2) Synthesis of 2-methylbutyl 4'-(10-acryloyloxydecyloxy)biphenyl-4-carboxylate A mixture of 20 mmol (5.6 g) of the bromoester compound (1c) obtain in (1), 18 mmol (5.1 g) of 2-methylbutyl 4'-hydroxybiphenyl-4-carboxylate obtained in Example 1, and 72 mmol (10 g) of potassium carbonate was refluxed for 8 hours in acetone. After the reaction solution was filtered and concentrated, the concentrate was recrystallized from ethanol, to obtain 4.6 g of the objective monomer (3c) [[α]$_D^{23}$= +2.88' (CHCl$_3$)]. (Yield. 52%)

(3) Polymerization 1.01 mmol (500 mg) of the monomer (3c) obtained in (2) was reacted in 5 ml of THF for 12 hours at 60° C. using 2.5 mg of AIBN as polymerization initiator. The product of polymerization was purified by column chromatography to obtain 300 mg of the objective liquid-crystalline polymer (A$_3$) (Mn=6,300). (Conversion percentage: 60%)

The phase transition behavior of the liquid-crystalline polymer (A$_3$) was measured, and the results are as follows:

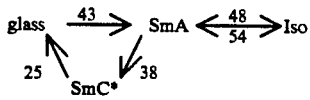

Preparation of Low Molecular Weight Liquid-Crystalline Compound

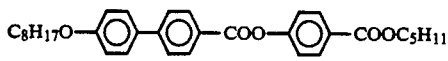

A low molecular weight liquid-crystalline compound having the above structure was synthesized according to the method disclosed in Japanese Patent Application Laid-open No. 32,748/1985.

The phase transition behavior of the obtained low molecular weight liquid-crystalline compound ($B_3$) was measured, and the results are as follows:

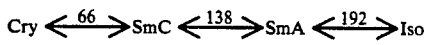

Preparation of Liquid-Crystalline Polymer Composition

A liquid-crystalline polymer composition ($C_3$) was prepared by blending the liquid-crystalline polymer ($A_3$) and the low molecular weight liquid-crystalline compound ($B_3$) in the weight ratio of ($A_3$)/($B_3$) = 80:20.

The phase transition behavior, electric field response speed, and contrast ratio of the composition ($C_3$) were measured. The results are as follows.

Phase transition behavior

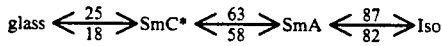

Response speed (0→90%): 0.03 seconds (48° C.)
Contrast ratio: 20

EXAMPLE 4

Preparation of the Liquid-Crystalline Polymer Having the Repeating Units Represented by the Following Formula

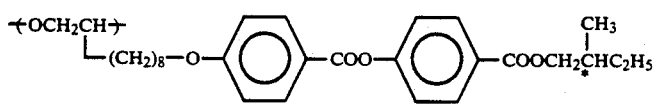

(1) Synthesis of 10-chloro-1-decene

To 26.0 g of 9-decene-1-ol was added 10 drops of pyridine, and the mixture was placed into an eggplant flask. To the mixture was added dropwise 24.0 g of thionyl chloride, during cooling with ice. After dropping thionyl chloride, reaction was carried out for 8.5 hours at 70° C. After conclusion of the reaction, the reaction solution was diluted with dichloromethane, and then washed with an aqueous potassium carbonate. The washed solution was dried on magnesium sulfate, and then concentrated under reduced pressure. The resulting residue was purified by column chromatography to obtain 27.7 g of 1-chloro-1-decene. (Yield: 95%)

(2) Synthesis of 2-methylbutyl 4-[4'-(9-decenyloxy)benzoyloxy]benzoate 17.5 g (0.1 mol) of 10-chloro-1-decene and 30 g (0.2 mol) of sodium iodide were dissolved in 2-butanone, and the resulting solution was stirred for 10 hours at 70° C. After conclusion of the reaction, the reaction solution was diluted with dichloromethane, and then the solvent used in the above reaction was distilled out under reduced pressure. To the residue were added 32.8 g (0.1 mol) of 2-methylbutyl 4-(4'-hydroxybenzoyloxy)-benzoate obtained in Example 1 and 55.2 g (10.4 mol) of potassium carbonate, and reaction was carried out in 2-butanone at 70° C. for 20 hours. After conclusion of the reaction, the inorganic matters were removed by filtration, and the filtrate was concentrated under reduced pressure. The concentrate was then purified by column chromatography to obtain 23.3 g of the objective unsaturated ester compound (2a). (Yield: 50%)

(3) Epoxidation 3.0 g (6.4 mmol) of the unsaturated ester compound (2a) obtained in (2) and 1.34 g (7.7 mmol) of m-chloroperbenzoic acid were dissolved in dichloromethane, and the resulting solution was stirred for 15 hours at room temperature after the atmosphere of the system was replaced with argon. After conclusion of the reaction, the reaction solution was washed with an aqueous potassium carbonate solution and then with water. After drying on magnesium sulfate, the solvent was distilled out under reduced pressure, to obtain 3.0 g of the objective monomer (3d) represented by the following formula. (Yield: 97%)

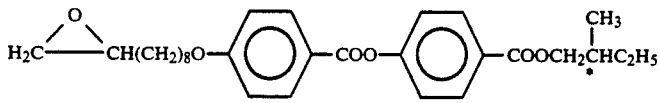

(4) Polymerization 2.2 g (4.6 mmol) of the monomer (3d) obtained in (3) was dissolved in 20 ml of dichloromethane, and the system was replaced with argon. To the solution was added 2.0 g of stannic chloride, and then polymerization reaction was carried out for 20 hours at room temperature. After conclusion of the reaction, the reaction solution was poured into methanol. The precipitate formed was purified by column chromatography to obtain 2.0 g of the objective liquid-crystalline polymer ($A_4$) ($Mn = 3,200$). (Conversion percentage: 91%)

The phase transition behavior of the liquid-crystalline polymer ($A_4$) was measured, and the results are as follows:

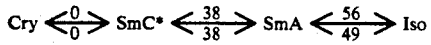

Low Molecular Weight Liquid-Crystalline Compound

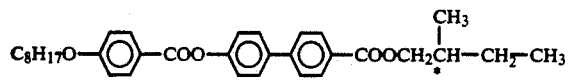

The phase transition behavior of the low molecular weight liquid-crystalline compound ($B_4$) was measured, and the results are as follows:

Preparation of Liquid-Crystalline Polymer Composition

A liquid-crystalline polymer composition ($C_4$ was prepared by blending the liquid-crystalline polymer ($A_4$ and the low molecular weight liquid-crystalline compound ($B_4$) in the weight ratio of ($A_4$)/($B_4$)=80:20.

The phase transition behavior, electric field response speed, and contrast ratio of the composition ($C_4$) were measured. The results are as follows.

Phase transition behavior

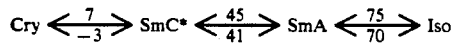

Response speed (0→90%): 0.01 seconds (35° C.)
Contrast ratio: 22

EXAMPLE 5

Preparation of the Liquid-Crystalline Polymer Having the Repeating Units Represented by the Following Formula

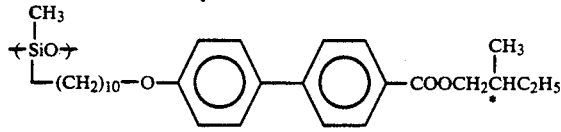

(1) Synthesis of 2-methylbutyl 4'-(9-decenyloxy)biphenyl-4-carboxylate 5.0 g of 10-chloro-1-dodecene and 12 g of sodium iodide were dissolved in 50 ml of methyl ethyl ketone, and the solution was stirred for 11 hours at 80° C. After conclusion of the reaction, the reaction solution was washed with water, and the organic phase was dried over magnesium sulfate, and then the solvent was distilled out under reduced pressure. To the residue were added 6.5 g of 2-methylbutyl 4'-hydroxybiphenyl-4-carboxylate, 3.3 g of potassium carbonate, and 50 ml of methyl ethyl ketone as solvent, and then reaction was carried out for 28 hours at 80° C. After conclusion of the reaction, the inorganic matters were removed by washing with water. After the organic phase was dried over magnesium sulfate, the solvent was distilled out under reduced pressure. The residue was purified by column chromatography to obtain 7.9 g of the objective unsaturated ester compound (2b). (Yield: 81%)

(2) Polymerization 5.4 g of 2-methylbutyl 4'-(9-decenyloxy)biphenyl-4-carboxylate obtained in (1) and 0.69 g of polymethylhydrosiloxane (produced by Aldrich Co., Ltd., $n_D$=1.3979, d=1.006, Mn=2,900) were dissolved in 20 ml of toluene. To the solution was added 3 mg of chloroplatinic acid as catalyst, and reaction was then carried out in the atmosphere of argon at 80° C. for 30 hours. After conclusion of the reaction, reprecipitation with methanol was carried out. The polysiloxane thus obtained was dried under reduced pressure, dissolved into dichloromethane, and then washed with water. Dichloromethane phase was collected and dried over magnesium sulfate. Then dichloromethane was distilled out under reduced pressure from the dichloromethane phase to obtain 1.8 g of the objective liquid-crystalline polymer ($A_5$) (Mn=14,000). (Yield: 30%)

The phase transition behavior of the liquid-crystalline polymer ($A_5$) was measured, and the results are as follows:

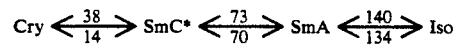

Preparation of Low Molecular Weight Liquid-Crystalline Compound

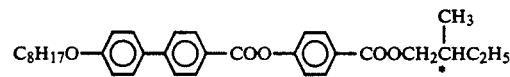

The low molecular weight liquid-crystalline compound ($B_5$) having the above structure was synthesized according to the method disclosed in Japanese Patent Application Laid-open No. 32,748/1985.

The phase transition behavior of the low molecular weight liquid-crystalline compound ($B_5$) was measured, and the results are as follows:

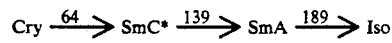

Preparation of Liquid-Crystalline polymer Composition

A liquid-crystalline polymer composition ($C_5$) was prepared by blending the liquid-crystalline polymer ($A_5$) and the low molecular weight liquid-crystalline compound ($B_5$) in the weight ratio of ($A_5$)/($B_5$)=85:15.

The phase transition behavior, electric field response speed, and contrast ratio of the composition ($C_5$) were measured. The results are as follows.

Phase transition behavior

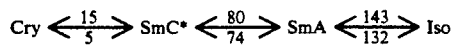

Response speed (0→90%): 0.01 seconds (65° C.)
Contrast ratio: 24

EXAMPLE 6

Preparation of the Liquid-Crystalline Polymer Having the Repeating Units Represented by the Following Formula

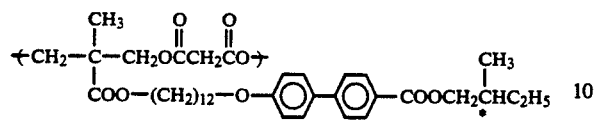

(1) Synthesis of 2-methylbutyl 4'-(12-bromododecyloxy)biphenyl-4-carboxylate 70.3 mmol (20 g) of 2-methylbutyl 4'-hydroxybiphenyl-4-carboxylate obtained in Example 1, 0.14 mol (46.2 g) of 1,12-dibromododecane, and 0.28 mol (38.7 g) of potassium carbonate were added into 500 ml of acetone, and the obtained solution was refluxed for 4 hours. After conclusion of the reaction, the reaction solution was filtered, and the filtrate was concentrated. The concentrate was purified by column chromatography to obtain the objective monobromo compound. (Yield: 73%)

(2) Synthesis of 2-methylbutyl 4'-[12-(2,2-dihydroxymethylpropionyloxy)dodecyloxy]biphenyl-4-carboxylate 30 mmol (4.0 g) of 2,2-dimethylolpropionic acid and 36 mmol (6.5 g) of tetramethylammonium hydroxide (pentahydrate) were added into 70 ml of DMF, and the mixture was stirred for 2 hours. To the mixture was then added 30 mmol (15.9 g) of the monobromo compound obtained above, and the mixture was stirred for 6 hours. To the reaction solution was then added 200 ml of water, and ether extraction was carried out. The resulting extract was concentrated, and the concentrate was purified by column chromatography, to obtain an ester compound having the following structure [[α]$_D^{23}$= +2.41° (CHCl$_3$)]. (Yield: 45%)

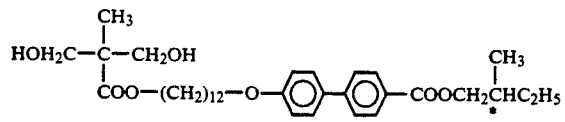

(3) Polymerization 1.7 mmol (1.0 g) of the ester compound obtained in (2) and 5 ml of pyridine were added into 30 ml of toluene, and the solution was stirred while maintaining the temperature at −70° C. To the solution was added dropwise 1.7 mmol (0.24 g) of malonyl dichloride, and the mixture was stirred for 12 hours at −70° C. Subsequently, the reaction solution was introduced into a large amount of acetone which is cooled to −70° C., to terminate the polycondensation reaction. After the temperature was returned to room temperature, the reaction solution was concentrated and the concentrate was purified by high speed liquid chromatography, to obtain the objective liquid-crystalline polymer (A$_6$) (Mn=5,000).

The phase transition behavior of the liquid-crystalline polymer (A$_6$) was measured, and the results are as follows:

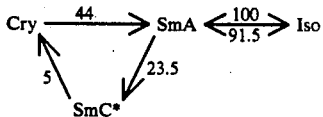

Preparation of Low Molecular Weight Liquid-Crystalline Compound

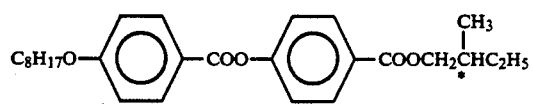

Synthesis of 2-methylbutyl 4-(4'-octyloxybenzoyloxy)benzoate

The low molecular weight liquid-crystalline compound (B$_6$) having the above structure was synthesized according to the method disclosed in Japanese Patent Application Laid-open No. 32,748/1985.

The phase transition behavior of the low molecular weight liquid-crystalline compound (B$_6$) was measured, and the results are as follow:

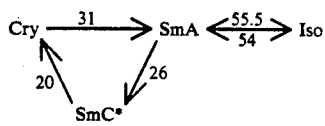

Preparation of Liquid-Crystalline Polymer Composition

A liquid-crystalline polymer composition (C$_6$) was prepared by blending the liquid-crystalline polymer (A$_6$) and the low molecular weight liquid-crystalline compound (B$_6$) in the weight ratio of (A$_6$)/(B$_6$)=80:20.

The phase transition behavior, electric field response speed, and contrast ratio of the composition (C$_6$) were measured. The results are as follows.

Phase transition behavior

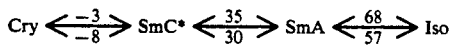

Response speed (0→90%): 0.02 seconds (25° C.)
Contrast ratio: 17

What is claimed is:

1. A liquid-crystalline polymer composition comprising a ferroelectric liquid-crystalline polymer (A) and a low molecular weight liquid-crystalline compound (B) which exhibits smectic C phase or chiral smectic C phase and which is at least one compound selected from the group consisting of
alkyl 4'-alkoxybiphenyl-4-carboxylate,
alkyl 4-(4'-alkoxybenzoyloxy) benzoate,
4'-alkoxyphenyl 4-alkoxybenzoate,
4''-alkoxyphenyl 4'-alkoxybiphenyl-4-carboxylate,
4'''-(alkoxycarbonyl)phenyl 4'-alkoxybiphenyl-4-carboxylate,
4''-(alkoxycarbonyl)biphenyl-4'-yl 4-alkoxybenzoate,
4''-alkoxybiphenyl-4'-yl 4-alkoxybenzoate,
alkyl 4-(4'-alkoxyphenylazo)benzoate,
4-(4'-alkoxyphenylazo)-1-acyloxybenzene, 4,4'-dialkoxyazobenzene,
4-(4'-alkoxyphenylazo)-1-alkylbenzene,
4-(4''-alkoxyphenylazo)-4'-alkoxycarbonlbiphenyl,
4-(4''-alkoxyphenylazo)-4'-alkylbiphenyl,
4-(4''-alkoxyphenylazo)-4'-alkoxybiphenyl,
4-(4''-alkoxyphenylazo)-4'-acyloxybiphenyl,
4-(4''-alkylphenylazo)-4'-alkoxybiphenyl,
4-(4''-acyloxphenylazo)-4'-alkoxybiphenyl,
4-(4''-alkoxycarbonylphenylazo)-4'-alkoxybiphenyl,
4'-alkoxyphenyl 4-alkylbenzoate,
4'-alkoxyphenyl 4-acyloxybenzoate,
4-(4''-alkoxyphenyloxycarbonyl)-4'-alkylbiphenyl,
4-(4''-alkoxyphenyloxycarbonyl)-4'-acyloxybiphenyl,
4-(4''-alkoxyphenyloxycarbonyl)-4'-alkoxycarbonylbiphenyl,
4-(4''-alkoxyphenylazoxy)-1-alkylbenzene,
4-(4''-alkoxyphenylazoxy)-1-acyloxybenzene,
4-(4''-alkoxyphenylazoxy)-1-alkoxybenzene,
alkyl 4-(4''-alkoxyphenylazoxy)benzoate,
4-(4''-alkoxyphenylazoxy)-4'-alkylbiphenyl,
4-(4''-alkoxyphenylazoxy)-4'-alkoxybiphenyl,
4-(4''-alkoxyphenylazoxy)-4'-acyloxybiphenyl,
4-(4''-alkoxyphenylazoxy)-4'-alkoxycarbonylbiphenyl,
4-(4''-alkylphenylazoxy)-4'-alkoxybiphenyl,
4-(4''-acyloxyphenylazoxy)-4'-alkoxybiphenyl,
4-(4''-alkoxycarbonylphenylazoxy)-4'-alkoxybiphenyl,
4-alkoxy-N-(4'-alkylbenzylidene)aniline,
4-alkoxy-N-(4'-alkoxybenzylidene)aniline,
4-alkoxy-N-(4'-acyloxybenzylidene)aniline,
4-acyloxy-N-(4'-alkoxybenzylidene)aniline,
4-alkoxycarbonyl-N-(4'-alkoxybenzylidene)aniline,
4-alkoxy-N-(4'-alkoxycarbonylbenzylidene)aniline,
4-(4'-alkylphenyl)-N-(4''-alkoxybenzylidene)aniline,
4-alkoxy-N-[4'-(4''-alkylphenyl)benzylidene]aniline,
4-(4'-alkoxyphenyl)-N-(4''-alkoxybenzylidene)aniline,
4-alkoxy-N-[4'-(4''-alkoxyphenyl)benzylidene]aniline,
4-(4'-acyloxyphenyl)-N-(4''-alkoxybenzylidene)aniline,
4-alkoxy-N-[4'-(4''-acyloxyphenyl)benzylidene]aniline,
4-(4'-alkoxycarbonylphenyl)-N-(4''-alkoxybenzylidene)aniline,
4-alkoxy-N-[4'-(4''-alkoxycarbonylphenyl)benzylidene]aniline,
4-alkyl-N-[4'-(4''-alkoxyphenyl)benzylidene]aniline,
4-(4'-alkoxyphenyl)-N-(4''-alkylbenzylidene)aniline,
4-acyloxy-N-[4'-(4''-alkoxyphenyl)benzylidene]aniline,
4-(4'-alkoxyphenyl)-N-(4''-acyloxybenzylidene)aniline,
4-alkoxycarbonyl-N-[4'-(4''-alkoxyphenyl)benzylidene]aniline,
4-(4'-alkoxyphenyl)-N-(4''-alkoxycarbonylbenzylidene)aniline,
4-alkyl-4'-alkoxybiphenyl,
4,4'-dialkoxybiphenyl,
4-acyloxy-4'-alkoxybiphenyl,
4-alkyl-4''-alkoxyterphenyl,
4,4''-dialkoxyterphenyl,
4-acyloxy-4''-alkoxyterphenyl, and
4-alkoxycarbonyl-4''-alkoxyterphenyl
wherein each of alkyl group and alkoxyl group has 1 to 20 carbon atoms and acyloxy group is an alkylcarbonyloxy group having 2 to 21 carbon atoms; the weight ratio of the ferroelectric liquid-crystalline polymer (A) to the low molecular weight liquid-crystalline compound (B), (A)/(B) being in the range of 99/1 to 50/50 and the ferroelectric liquid crystalline polymer (A) being a polyester consisting essentially of the repeating units represented by the following general formula:

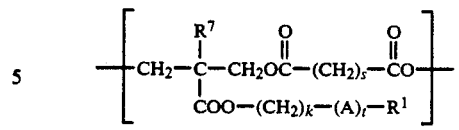

wherein
k is an integer of 1 to 30,
R¹ is

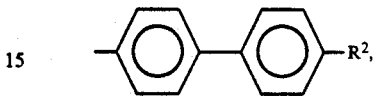

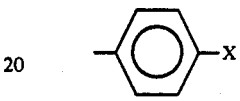

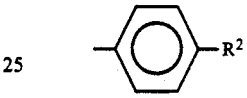

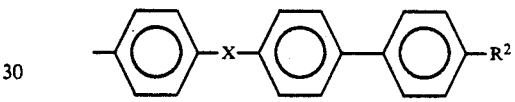

or

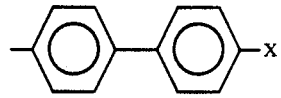

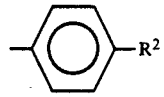

X is —COO— or —OCO—,
R² is —COOR³, —OCOR³, —OR³ or —R³,
wherein
R³ is a radical represented by the following general formula:

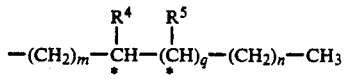

wherein
m and n are each independently an integer of 0 to 9,
q is 0 or 1,
R⁴ and R⁵ are each independently —CH₃, a halogen radical or —CN, with the proviso that n is not 0 when R⁵ is —CH₃,
C* is an asymmetric carbon atom,
C(*) is an asymmetric carbon atom when n is not 0, and
wherein
R⁷ is —H, —CH₃ or —C₂H₅,
s is an integer of 1 to 20,
A is O (oxygen) or —COO—, and
t is an integer of 1 to 30.

2. The liquid-crystalline polymer composition as claimed in claim 1, wherein the low molecular weight liquid-crystalline compound (B) is 2-methylbutyl 4'-(4''-decyloxybenzoyloxy)biphenyl-4-carboxylate,
4,4'-nonyloxyazoxybenzene,
4''-(pentyloxycarbonyl)phenyl 4'-octyloxybiphenyl-4-carboxylate,
2-methylbutyl 4'-(4''-octyloxybenzoyloxy)biphenyl-4-carboxylate,
4''-(2-methylbutyloxycarbonyl)phenyl 4'-octyloxybiphenyl-4-carboxylate or
2-methylbutyl 4-(4'-octyloxybenzoyloxy)benzoate.

3. The liquid-crystalline polymer composition as claimed in claim 1, wherein the ferroelectric liquid-crystalline polymer (A) is a polyester consisting essentially of the repeating units represented by the following formula:

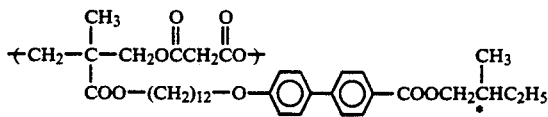

and the low molecular weight liquid-crystalline compound (B) is 2-methylbutyl 4-(4'-octyloxybenzoyloxy)benzoate.

* * * * *